US009672258B2

(12) United States Patent
Nee et al.

(10) Patent No.: US 9,672,258 B2
(45) Date of Patent: Jun. 6, 2017

(54) SYSTEMS AND METHODS FOR DYNAMICALLY SELECTING GRAPHICAL QUERY RESULT DISPLAY MODES

(71) Applicant: Pitney Bowes Inc., Stamford, CT (US)

(72) Inventors: Albert Temho Nee, Raleigh, NC (US); Deborah Lynn Purcell, Ann Arbor, MI (US)

(73) Assignee: Pitney Bowes Inc., Stamford, CT (US)

( * ) Notice: Subject to any disclaimer, the term of this patent is extended or adjusted under 35 U.S.C. 154(b) by 698 days.

(21) Appl. No.: 13/729,884

(22) Filed: Dec. 28, 2012

(65) Prior Publication Data
US 2013/0304725 A1 Nov. 14, 2013

Related U.S. Application Data

(60) Provisional application No. 61/645,602, filed on May 10, 2012.

(51) Int. Cl.
G06F 17/30 (2006.01)
(52) U.S. Cl.
CPC .. G06F 17/30554 (2013.01); G06F 17/30545 (2013.01)
(58) Field of Classification Search
CPC ............... G06F 17/30554; G06F 17/30572
See application file for complete search history.

(56) References Cited

U.S. PATENT DOCUMENTS

| RE42,413 E | 5/2011 | Snyder | |
| 8,090,703 B1 | 1/2012 | Agarwal et al. | |
| 8,103,445 B2 | 1/2012 | Smith et al. | |
| 2006/0190431 A1 | 8/2006 | Dendl et al. | |
| 2006/0212429 A1* | 9/2006 | Bruno et al. | 707/3 |
| 2007/0282797 A1 | 12/2007 | Wang et al. | |
| 2008/0201302 A1* | 8/2008 | Kimchi et al. | 707/3 |
| 2008/0270366 A1* | 10/2008 | Frank | 707/3 |
| 2012/0023097 A1 | 1/2012 | Lebeau et al. | |
| 2013/0102364 A1* | 4/2013 | Bliss et al. | 455/566 |
| 2013/0297591 A1* | 11/2013 | Seefeld et al. | 707/722 |

* cited by examiner

Primary Examiner — Khanh Pham
(74) Attorney, Agent, or Firm — Michael J. Cummings; Charles R. Malandra, Jr.; Steven Shapiro

(57) ABSTRACT

Systems and methods for displaying graphical database query results on a map by dynamically selecting graphical query result display modes are described. In one example, the system includes a distributed database query system having a remote server and a local client computer. The remote server receives a query request from the client and obtains a threshold number of results for display. If a particular query provides less than the threshold number of results, the system uses a first interactive graphical query result mode utilizing client rendering. If the query provides the threshold number of results or more, the system uses a second non-interactive graphical query result mode utilizing server rendering.

3 Claims, 4 Drawing Sheets

SYSTEMS AND METHODS FOR DYNAMICALLY SELECTING GRAPHICAL QUERY RESULT DISPLAY MODES

CROSS REFERENCE TO RELATED APPLICATIONS

This application claims priority under 35 U.S.C. section 119(e) from Provisional Patent Application Ser. No. 61/645,602, filed May 10, 2012, entitled Systems And Methods For Dynamically Selecting Graphical Query Result Display Modes, by Albert Temho Nee, et al., which is incorporated herein by reference in its entirety.

TECHNICAL FIELD

The illustrative embodiments of the present invention relate generally to displaying graphical database query results and, more particularly, to displaying graphical database query results on a map by dynamically selecting graphical query result display modes.

BACKGROUND

Many companies utilize systems that display query result information in a map display format. For example, real estate companies provide database systems that allow users to query homes for sale in a certain area that meet certain parameter criteria such as a number of bedrooms and/or a maximum asking price. In such systems, the user is often presented with a map display that includes an icon at a respective location for each home that matches the criteria.

Current database systems utilize very large datasets. According to the U.S. Census Bureau, there are over 300 million people, over 100 million households and over 25 million businesses In the United States. Database queries into large datasets may provide millions of responsive records that could slow the system.

Accordingly, there is a need, among other needs, for systems and methods that efficiently display graphical database query results.

SUMMARY

Illustrative systems and methods for displaying graphical database query results on a map by dynamically selecting graphical query result display modes are described. In one configuration, the illustrative system includes a distributed database query system having a remote server and a local client computer. The remote server receives a query request from the client and obtains a threshold number of results for display. If a particular query provides less than the threshold number of results, the system uses a first graphical query result mode. For example, the server would send the results in a record format to the client for local rendering onto an interactive map display. Alternatively, if the query provides the threshold number of results or more, the system uses a second graphical query result mode. For example, the server would render the results remotely, and then send the rendered map display to the client for local display or a rendered map results overlay for display over the map at the appropriate zoom and location.

In at least certain embodiments, a pixel rendering mode is utilized that iterates over the requested features serially in a quick and memory-efficient manner, rendering them to an image on the server and sending the resulting image back to the client.

BRIEF DESCRIPTION OF THE DRAWINGS

The accompanying drawings show illustrative embodiments of the invention and, together with the general description given above and the detailed description given below serve to explain certain principles of the invention. As shown throughout the drawings, like reference numerals designate like or corresponding parts.

DETAILED DESCRIPTION

Figure 1:
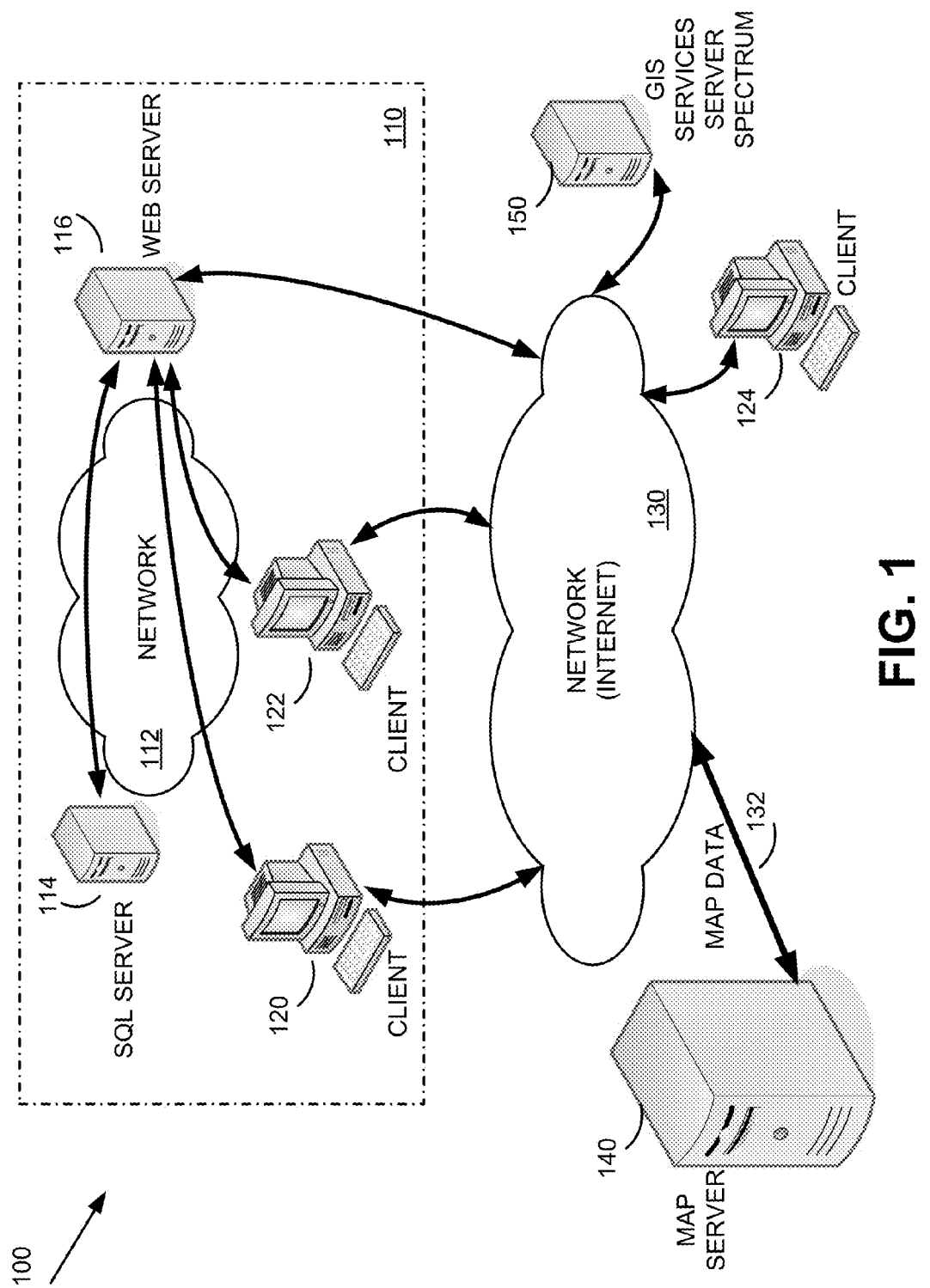
FIG. 1 is a diagram showing a system and information flow for displaying graphical database query results on a map by dynamically selecting graphical query result display modes according to an illustrative embodiment of the present application.

The illustrative embodiments of the present invention that are described herein provide efficient display of large sets of graphical database query results. In the illustrative embodiments, the graphical displays use a map as a backdrop, but other backdrops may be used in alternatives. As described above, many current database systems utilize very large datasets. According to the U.S. Census Bureau, there are over 300 million people, over 100 million households and over 25 million businesses In the United States. Database queries into large datasets may provide millions of responsive records that could slow the system.

For example, when working with a large data set such as a database of all pharmacies in the United States, a set of key criteria may be selected to form an SQL query using a graphical user interface to select key fields or ranges in key fields such as by using a slider interface in an interactive query frame for key fields such as number of employees, number of prescriptions processed per year and any selected affiliation.

Additionally, the query may be based upon a map zoom view that is present in the map based results frame. For example, if a user were searching for relevant pharmacies in a particular city, the number of resulting records may be very manageable for the server and the client. However, it is very easy to enlarge the results map area using a slider with the perhaps unintended consequence of selecting a very large number of records for display. If the user elected the entire country, the number of records may have a detrimental impact on system performance at the server and client.

In this example, an updated query is automatically refreshed when a user zooms in the display frame. For example, a browser may have a top 10% menu frame with the below space split between a left query frame and right results map frame. For example, the one or more SQL or other selection criteria are entered in a query frame such as in the left quarter frame of a browser. The results map frame on the right includes a zoom tool. Accordingly, the query is first performed at the current map zoom and the results displayed in accordance with the selected parameters. Thereafter, if the results map frame is zoomed in or out, the query results change based upon the selected map area. Having benefit of the teachings herein, one can now appreciate that a user may inadvertently zoom out significantly and cause the query to encompass millions or records, thereby slowing or stalling the server. It can now be appreciated that a configuration involving where a large number of requested features or fields that are requested from a server for presentation using a client map control could lead to undesirable timeouts, and long wait times.

Here, it has now been appreciated that there are problems related to displaying a large number of features for visualization on a map. While not all of the following problems are relevant to each of the solutions provided by the systems and methods described herein, they are useful in understanding some aspects discussed. A first problem is memory related, since the server may be configured to cache the entire dataset before transmitting it to the client. A second problem is bandwidth related, with non-acceptable wait times occurring when the client has to wait for the large dataset to be returned from the server. A third problem relates to the long time it takes for the client to process very large datasets. A fourth problem relates to an inability for certain clients using a mapping control graphics engine to render all the features in a timely and memory-efficient manner.

Generally, the database user would prefer to visualize their entire requested results dataset on the map at the selected zoom level regardless of record count or map extent, while retaining as much interactivity as possible. The systems and methods described herein dynamically decide, in a quick and memory-efficient manner, when to switch to a pixel rendering mode, such as when the number of query result records exceed a certain threshold. If this threshold is exceeded, the system proceeds to extract location information from each result record, renders that information onto a bitmap or overlay in memory using styling information passed with the query, compresses the image, and returns the compressed image for display on the client's map control. If the threshold is not exceeded, the query returns the full actual dataset to allow for a more interactive user experience.

In pixel rendering mode, the system iterates over the requested features serially, in a quick and memory-efficient manner, rendering them to an image on the server and sending the resulting image back to the client. Here, for a large set of query results, the entire dataset is not loaded into server memory, but rather can be processed serially or in batches so that the required location information may be extracted from each record and rendered in a memory-efficient manner.

Here, a map feature fetching routine that detects when the number of features requested by a query exceeds a certain threshold, and automatically switches to a pixel rendering mode instead of gathering the default, full set of records provides greater efficiency. For example, the database user is provided a better user experience. The system provides a high-level overview of the requested features in a quick and memory efficient manner. The memory optimization helps prevent out of memory conditions on the server, which can impact server performance and stability for all users accessing the server.

Referring to FIG. 1, a diagram showing a system 100 and information flow for displaying graphical database query results on a map by dynamically selecting graphical query result display modes according to an illustrative embodiment of the present application is shown. In this particular example, an illustrative configuration includes a corporate system 110 such as a firewalled, LAN (local area network)/WAN (wide area network)/VPN (virtual private network) connected, multi-campus computing environment. Here, an illustrative current MICROSOFT SQL server 114 is provided connected to the corporate network 112. The SQL server 114 may host many different datasets with tables that can be accessed by a client running a visual map based query control. Here, server 116 comprises a current MICROSOFT Internet Information Services (IIS) server also connected to the corporate network 112, the web server 116 and corporate network 112 are connected to the Internet or alternatively to another wider area network 130. Here, clients 120 and 122 are within the firewalled corporate system 110. The clients 120, 122 are running an Internet Explorer 9 (IE9) browser running a Silverlight based query page including a map-based results frame.

In this illustrative example, a remote map server 140 such as a MICROSOFT BING MAP web service provides map data 132 through the Internet 130 to the clients 120, 122, 124. Alternatively, the map data can be local and can be hosted on or through the server processing the query. Client 124 is a remote client that can be utilized outside the corporate firewall or would be illustrative in the alternative embodiment of the query service described herein provided as a service to remote clients. Additionally, other GIS services such as the PITNEY BOWES SOFTWARE SPECTRUM service may be optionally connected such as through server 150 connected to the Internet 130. Similarly, other available GIS Services systems may be implemented in system 100 such as by being hosted on server 150.

Here, SQL Server 114 communicated with web server 116 and provides the following communication: sqlConnection, (ADO.NET) and AD Authentication. The IIS web server 116 communicates with the clients and optionally the SPECTRUM server 150 and provides the following communication: Web Services (WCFADO/WCFADODuplex).

In this illustrative example, a MICROSOFT SILVERLIGHT Platform is utilized along with a BING MAPS SILVERLIGHT control. In an alternative applicable herein, other mapping systems such as a BING MAPS AJAX control or GOOGLE MAPS may be utilized. Similarly, LINUX platforms may be used, such as with an APACHE web server, and alternative databases such as ORACLE may be utilized. Here, the algorithms described may be running on the SQL server 114, the web server 116 and/or the client 120, 122, 124 or any combination thereof as appropriate. The web server function and SQL server function may instead be hosted on the same computer server. The client side logic may be running on the client computer or the web server computer or any appropriate combination.

In at least one illustrative embodiment described herein, a user query request must contain a query, location schema (latitude/longitude or geometry column info), one or more thresholds for switching modes, information about the mapping display context (width/height, geographic bounding box), and styling information (optional). The system then performs a preliminary fetch of the first X+1 records from the SQL server 114, where X is the maximum number of records to avoid returning an image. If the result set contains <X+1 records, the algorithm simply returns the full result set so that the client can process that information and display it in an interactive manner. The interactive display mode receives the record data so that the display frame can display hover notifications, tooltips, selected popup fields, etc. that are available in a fully interactive map display mode.

However, if the result set contains >X records, the system creates a sequential-access ADO.NET Data Reader in order to avoid loading the full dataset into memory. It then iterates over all records in the dataset and renders them to a bitmap. The bitmap is then compressed using a lossless compression library and the compressed image is returned to the client for display on their map control. Alternatively, the results location data is rendered into a location-based overlay of result icons or colored pixels that is superimposed on a map by the client Silverlight control.

Here, the threshold X has been empirically determined to be effectively set at 3000 records for databases such as the pharmacy example above. In an alternative, the user may set the threshold or select from a number of thresholds such as 100, 1000 and 10000. Additionally, the threshold may alternatively be set by the dataset that is being queried. For example, some datasets may return very large records and the threshold may be set lower, such as at 1000 to avoid data processing delays and memory usage concerns. Similarly, other records may be very small or only a small number of fields were requested to be returned for each selected records. In such case, the threshold may be set higher such as at 5000 without negatively impacting performance. In other cases, a threshold of 100,000 may suffice, while in certain others 100 will be more appropriate. Each dataset may include threshold record. Alternatively, a table of appropriate thresholds may be provided with threshold values for one or more datasets.

Here, features such as result fields are selected in the query frame for display in the results map frame. For example, check boxes or check icons in the query frame are selected to determine which features are displayed on the map for each resulting record. In one example, the selected record identifier box results in a pop-up near each push pin or other location indicator that displays the identifier field value. As with any of the queries here, in an alternative, each of the results may be thought of as layered in that multiple query field selections may create multiple layers of results that are displayed to the user as a single results map. Optionally, each layer may utilize a distinct result location indicator such as a distinctly colored pushpin for each layer. Similarly, displayed features may be thought of as layered.

In yet another embodiment, the display mode threshold described herein is based at least in part on whether the map result frame rendering engine clears memory associated with each refresh of the map such as when a user zooms to another level of detail. In this alternative, the threshold is set based upon the identity and/or a characteristic of the results map rendering engine. Here, if the map results rendering engine clears memory of previously displayed feature data for each map refresh, the threshold is set higher such as by setting a constant (6000) or by doubling the standard value—from 3000 to 6000 or doubling any retrieved or calculated value. Alternatively, the constant, adjustment factor and/or a set of threshold values may be set for each rendering engine used. Conversely, for a rendering engine that does not clear memory of previously displayed feature data at each results map refresh the standard threshold value is set lower such as by setting a constant (1500) or by halving the standard value—from 3000 to 1500 or halving any retrieved or calculated value. Additionally, the adjustment factor and/or a set of threshold values may be set for the particular rendering engine used. For example, BING AJAX may be set at a factor of 2.0 if appropriate and GOOGLE MAPS may be set at 0.5 if appropriate.

In certain embodiments described herein, a database query results image is created remotely at a server and includes an underlying map and results data such as in the form of location pixels that are rendered on the map image. The map image with results data is then optionally compressed and sent to the client for display to the user in the results browser frame. However, in an alternative embodiment, the server may render a results overlay that is sent to the client for display over a map that is also displayed by the client in the results browser frame.

As described herein, the servers may include DELL computers and may be required to meet the following minimum requirements: MICROSOFT WINDOWS SERVER 2003+ (2008+ recommended), MICROSOFT SQL SERVER 2008 R2 with SSMS, MICROSOFT IIS 7.5+, MICROSOFT .NET 4.0+, MICROSOFT ASP.NET 4.0+, MICROSOFT SILVERLIGHT 4.0+, MICROSOFT WEB DEPLOYMENT TOOL, and an SSL certificate from an SSL certificate provider (recommended). Similarly, the Clients 120, 122, 124 may include DELL desktop computers and may be required to meet the following minimum requirements: MICROSOFT XP+, MICROSOFT .NET 4.0+ and MICROSOFT SILVERLIGHT 4.0+.

Figure 2:
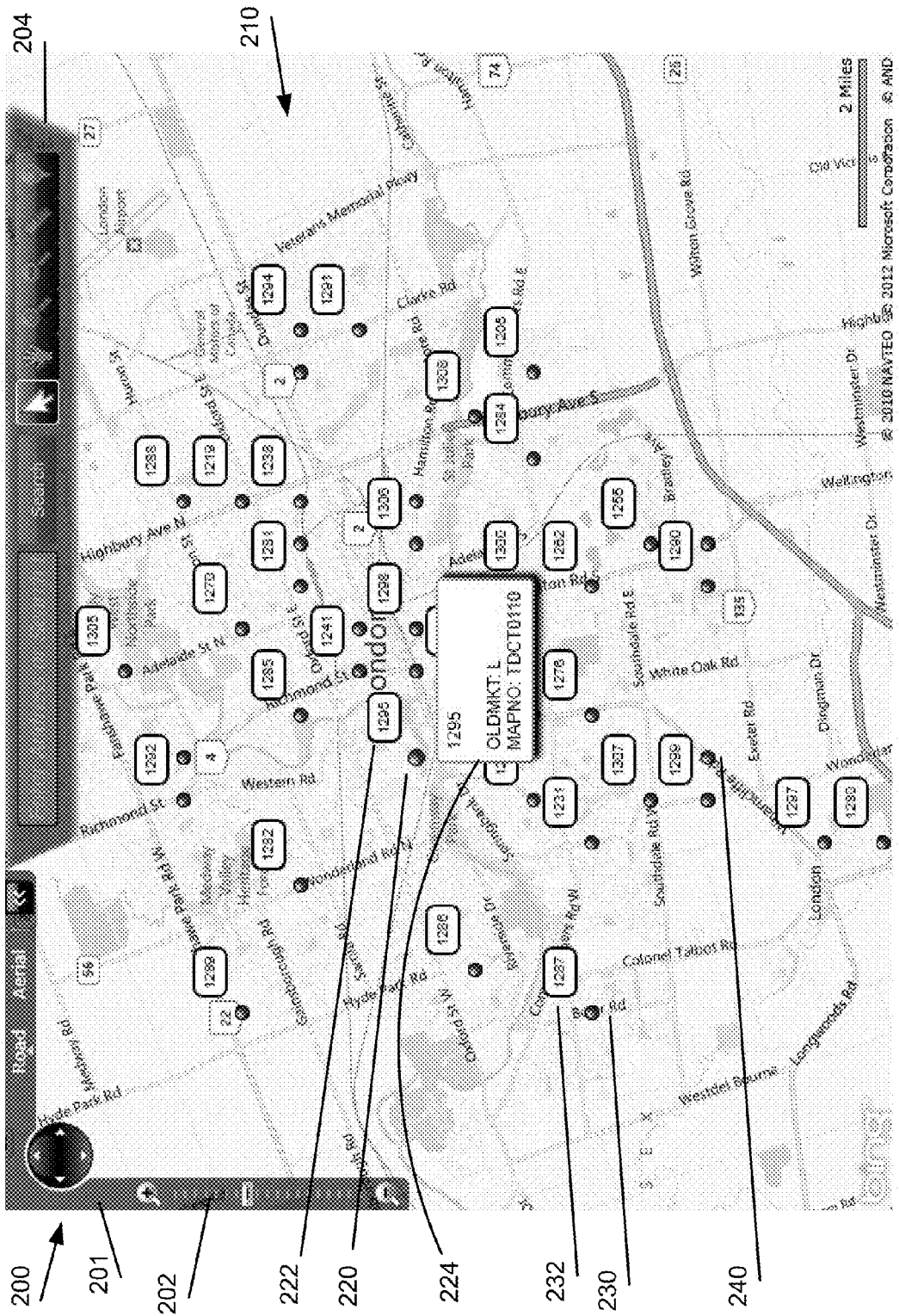
FIG. 2 is a user interface diagram showing a display frame for displaying interactive query results data in a map frame in a graphical user interface format according to an illustrative embodiment of the present application.

Referring to FIG. 2, a user interface diagram 200 showing a display frame for displaying interactive query results data in a map frame in a graphical user interface format according to an illustrative embodiment of the present application is shown. Here, the results frame portion 200 of the IE9 display is shown. The top toolbar and left query frame are not shown for simplicity. The SILVERLIGHT CONTROL results frame 200 includes a BING map toolbar 201 that includes tools such as zoom slider 202. These BING map tools allow an updated query to be performed using only a query area change set by the zoom slider as described above. An application specific toolbar 204 is also provided and may be used to modify the display by adding features or may also modify the query.

Here, the map display 210 provides certain road and area features. Superimposed upon the map 210 are numerous database query result record indicators. Record 1295 is displayed via a location pin 220, a popup record field 222 that indicates the result record field number 1295 and record popup 224 that displays additional selected fields when the mouse hovers over that result item. Similarly, result record 1287 is indicated by pin 230 and popup 232. Another result is shown with only pin 240. This display is an example of a first interactive map-based graphical results display in which a results threshold has not been exceeded. Accordingly, the requested fields have been sent from the SQL server 114 to the client via the web server 116. Accordingly, the user is provided a fully interactive results experience with the associated rich dataset with popup data available. Here, the SILVERLIGHT map control is used to display results by location and with interactive data elements such as hover data and selectable field displays such as the record identifier. The field selections may be provided using the left query window that is not shown.

Figure 3:
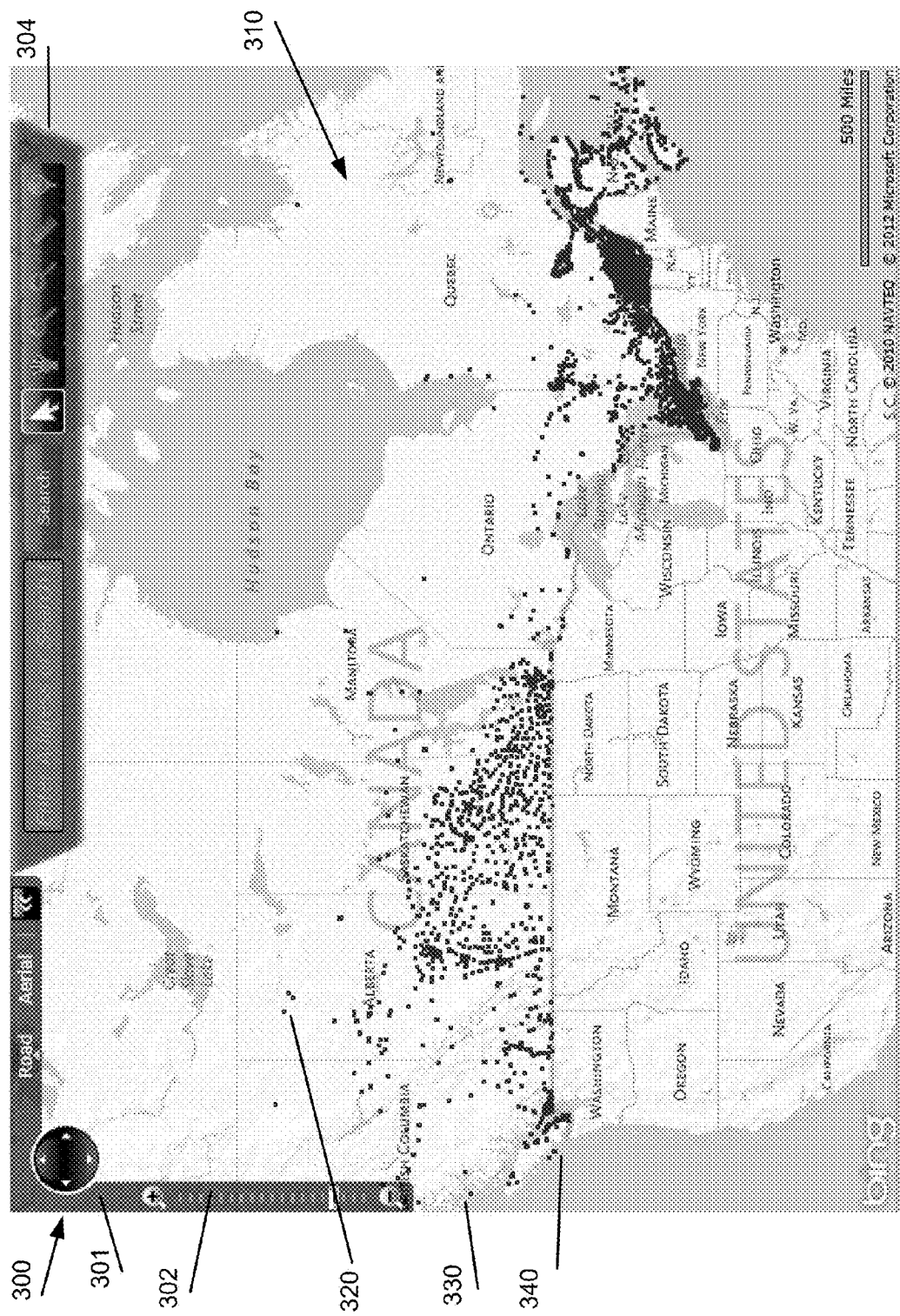
FIG. 3 is a user interface diagram showing a display frame for displaying non-interactive query results data in a map frame in a graphical user interface format according to an illustrative embodiment of the present application.

Referring to FIG. 3, a user interface diagram 300 showing a display frame for displaying non-interactive query results data in a map frame in a graphical user interface format according to an illustrative embodiment of the present application is shown. Here, the results frame portion 300 of the same IE9 display is shown, but now in a non-interactive, second graphics display mode. The top toolbar and left query frame are not shown for simplicity. The SILVERLIGHT CONTROL results frame 300 still includes a BING map toolbar 301 that includes tools such as zoom slider 302.

These BING map tools allow an updated query to be performed using only a query area change set by the zoom slider as described above. Similarly, an application specific toolbar 304 is also provided and may be used to modify the display by adding features or may also modify the query.

Here, the map display 310 is at a high zoom and provides certain high level area features such as country and certain regional boundaries. Here, the map 310 has been pre-rendered at the server such as at IIS server 116. The map 310 includes numerous database query result record indicators that have also been pre-rendered onto the map. In this case, the threshold of 3000 selected resulting records has been exceeded and sample records are reflected by 3×3 pixel or smaller boxes such as 320, 330 and 340. In very high concentrations such as 100,000 records, one pixel per record is used. This display is an example of a second, non-interactive map-based graphical results display in which a results threshold has been exceeded. Accordingly, the requested fields have not been sent from the SQL server 114 to the client via the web server 116. Instead, the server, such as web server 116, processes the results serially or in batches to extract location information such as longitude/latitude or SQL location records to obtain location data for each result or a subset of the results if appropriate. In an alternative, a heat-map type of colored display is rendered in which color is used to describe the density of results in a location that cannot be separately displayed due to the high zoom level. For example, a red pixel indicates more than 100 results at the location, an orange pixel indicates 10-100 and a blue pixel indicates less than 10 results at the location.

The extracted location information is then utilized to render a map or map overlay having location based results icons shown 320, 330, 340. The web server 116 then optionally compresses the rendered results map and sends it to the client 120, 122, 124 for display to the user in the results frame 300. Here, the map 300 may be rendered as a bitmap and the compressed version includes a lossless PNG compressed file. Alternate forms such as JPG Jpeg files may be used as appropriate for the map or overlay that is returned to the client.

Accordingly, the user is provided a timely, memory-efficient, full view of the results by location, but without a rich dataset including popup data available. Here, the SILVERLIGHT map control may be used to display results by location, but without interactive data elements such as hover data and selectable field displays such as the record identifier. When the user zooms in, the result value may no longer exceed the threshold and the rich data of FIG. 2 may be presented. If the results overlay is used, the SILVERLIGHT map control may be used to obtain the BING map at the correct zoom level and location, but without any selected fields for display so that the results overlay bitmap may be used.

Figure 4:
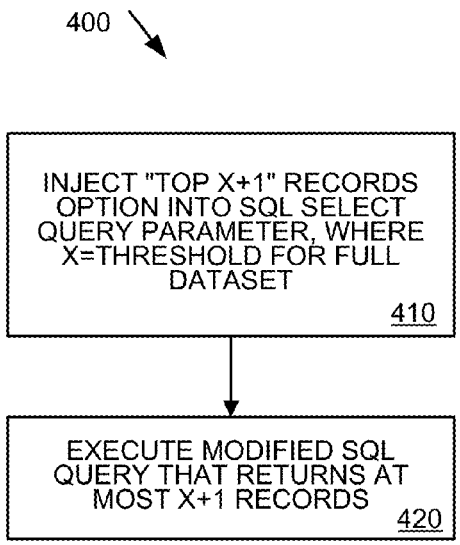
FIG. 4 is a process flow diagram showing a process for modifying a database query according to an illustrative embodiment of the present application.

Referring to FIG. 4, a user interface diagram 400 showing a process for modifying a database query according to an illustrative embodiment of the present application is shown. In step 410, a typical SQL query is modified to provide for dynamically changing the display mode based upon a threshold as described herein. Accordingly, the method injects a "Top X+1" records option into a SQL select query parameter, where X=threshold of results for the full dataset. In step 420, the modified SQL query is executed as described further below. In step 420, the method executes the modified SQL query that returns at most X+1 records or an alternative display.

Figure 5:
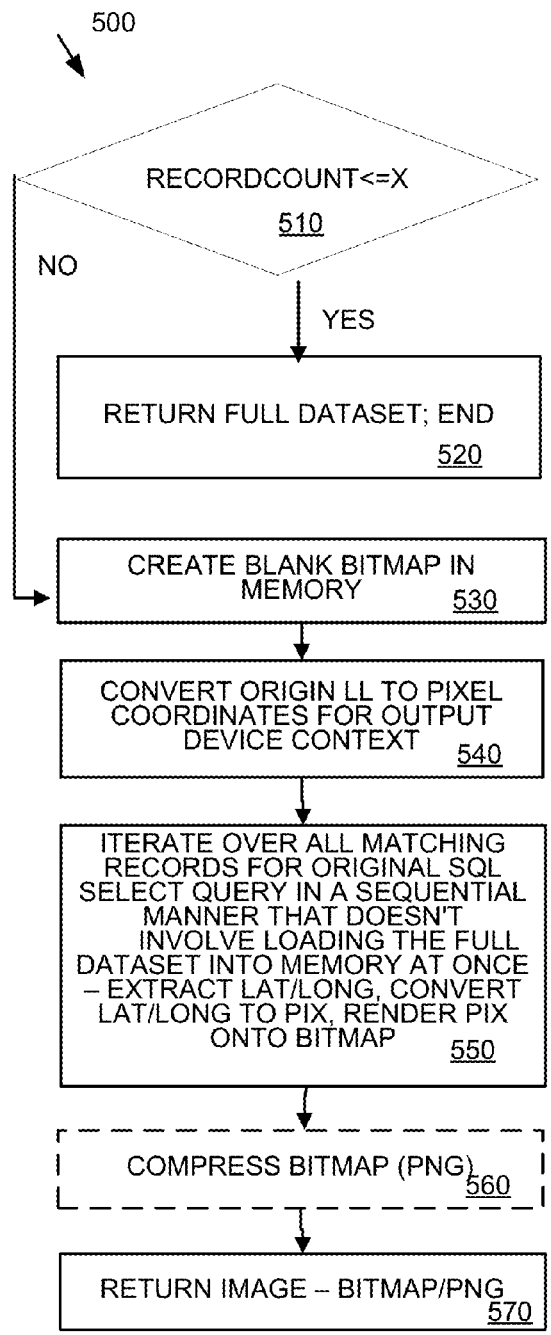
FIG. 5 is a process flow diagram showing a process for dynamically selecting graphical query result display modes according to an illustrative embodiment of the present application.

Referring to FIG. 5, a process flow diagram showing a process 500 for dynamically selecting graphical query result display modes according to an illustrative embodiment of the present application is shown. In step 510, the method determines if the SQL query result count would exceed the threshold. For example, If (RecordCount<=X) determines the resulting record count. Here, X is the set threshold such as 3000. As described above, X may be set as a constant value, may be obtained such as a function of the particular dataset and may be calculated such as by a function of the number of fields requested for each record. For example, in an alternative, if only five fields are requested per record, the threshold increases to 4000, and if six or more fields are requested, the threshold drops to 2000.

If the threshold is not exceeded in step 510, the method proceeds to step 520 and the method returns the full requested result dataset to the client system and ends.

If the threshold is exceeded in step 510, the method proceeds to step 530 and the method begins to render an alternative result display such as a in this example, creating a blank bitmap in memory. The map may be populated into the bitmap or a blank bitmap may be used if an overlay is going to be returned as described herein.

In step 540, the process converts the origin longitude/latitude data for the map context to pixel coordinates for the requested results map. Accordingly, the origin pixel location coordinates are created for the output device context, whether rendered in a bitmap as an overlay or on the map at the server. Next, in step 550, the method processes each resulting record, either serially, or in memory manageable batches to extract the required location data (using the source latitude/longitude ("LL"), SQL location field or other location data). The process iterates over all matching records from the original SQL select query in a sequential manner (serially, manageable batch, etc.) that doesn't involve loading the full dataset into memory at once. It extracts LL from current record, converts LL to pixel coordinates for the map control based on map control's projection method and renders the pixel or pixel box (3×3) onto the bitmap at the current record's pixel coordinates inversely offset by origin's pixel coordinates using a style parameter.

In step 560, the process optionally compresses the bitmap such as into a PNG format from a raw format such as a GIF format. In step 570, the process returns the image to the client for display to the user in the right map-based results frame.

Here, pseudo code for a portion of the system is provided:

```
Inject "Top X+1" records option into SQL select query
parameter, where X=threshold for full dataset
    Execute modified SQL query that returns at most X+1 records
    If (RecordCount<=X)
       then Return full dataset; end;
    else
       Create blank bitmap in memory
    Convert origin LL to pixel coordinates for output device context
    Iterate over all matching records for original SQL select query
in a sequential manner that doesn't involve loading the full dataset into
memory at once
       Extract LL from current record
       Convert LL to pixel coordinates for map control based on
map control's projection method
       Render pixel onto bitmap at current record's pixel
coordinates inversely offset by origin's pixel coordinates using
style parameter
    Compress bitmap using lossless compression format (png)
    Return png image bytes (ImageWidth x ImageHeight total
pixels) for overlaying on top of map control
    end;
```

In an alternative embodiment, result clustering techniques are utilized to provide a more robust and interactive experience for the user when the result dataset is large. In this illustrative embodiment, if a threshold is exceeded for the number of results, an alternative second display mode including live data clustering is provided. Here, the system uses the area covered by the query results map to develop a results grid. The results grid may be uniform across the area, such as ⅕ scale, 1/20 scale, 1/100 scale or the like. Alternatively, the results grid may be based upon map segmentation such as by state. Accordingly, if over the results threshold, the results are processed in a clustering algorithm. As in the non-interactive embodiment above, the results are sequentially processed (serially, or in memory efficient batches) to obtain location information. Here, however, the record identifiers are counted and saved in a separate aggregated list assigned for each defined cluster. When the large data set processing is complete at the server, a single live icon with a record count or other cluster relevant identifier is passed back to the client for display on the map.

For example, when clustering patent attorneys, an icon for Connecticut might display the number 1000 or so and the cluster list icon for New York might display 10,000. Here, the user may hover over the icon for Connecticut and the system would then obtain requested data from the server for display to the user. In another alternative, each field is aggregated such as by total or median and or mean as appropriate for the field. Thereafter, when the user hovers over a cluster icon, the server merely interrogates the temporarily stored cluster file to display the aggregated hover data for the requested cluster icon. Similarly, pop-up field data may be displayed on the map associated with each cluster icon in an aggregated data form.

Certain components and subsystems described herein include and/or are enhanced modified versions of commercially available systems that may be obtained from PITNEY BOWES SOFTWARE INC. of Troy, New York and PITNEY BOWES INC. of Stamford, Conn. For example, SPECTRUM is available in certain versions. The servers described are typically DELL INTEL architecture servers using the WINDOWS SERVER operating system and MICROSOFT SQL database software.

The various systems and subsystems described herein may alternatively reside on a different configuration of hardware such as a single server or distributed server such as providing load balancing and redundancy. Alternatively, the described systems may be developed using general purpose software development tools including C#, Java and/or C++ development suites including MICROSOFT VISUAL STUDIO. The server systems described herein typically include WINDOWS/INTEL Servers such as a DELL POWEREDGE Server (M620, T620, R620) and include database software including MICROSOFT SQL software. Alternatively, other servers such a SUN FIRE T2000 and associated web server software such as SOLARIS and JAVA ENTERPRISE and JAVA SYSTEM SUITES may be obtained from several vendors including Sun Microsystems, Inc. of Santa Clara, Calif. PC. Alternative database systems such as ORACLE 10i and SQL may be utilized.

The user computing systems described may include WINDOWS/INTEL architecture systems running WINDOWS and INTERNET EXPLORER BROWSER such as the DELL DIMENSION E520 available from Dell Computer Corporation of Round Rock, Tex. While the electronic communications networks have been described as physically secure local area network (LAN) connections in a facility, external or wider area connections such as secure Internet connections may be used. Other communications channels such as Wide Area Networks, telephony and wireless communications channels may be used. One or more or all of the data connections may be protected by cryptographic systems and/or processes. Each computer may include one or more operating systems, appropriate commercially available software, one or more displays, wireless and/or wired communications adapter(s) such as network adapters, nonvolatile storage such as magnetic or solid state storage, optical disks, volatile storage such as RAM memory, one or more processors, serial or other data interfaces and user input devices such as keyboard, mouse and audio/visual interfaces. Laptops, tablets, PDAs and smart phones may alternatively be used herein.

Although the invention has been described with respect to particular illustrative embodiments thereof, it will be understood by those skilled in the art that the foregoing and various other changes, omissions and deviations in the form and detail thereof may be made without departing from the scope of this invention.

What is claimed is:

1. A computer Implemented method for sending query results of a query received from a client computer comprising:
    obtaining a threshold value indicating a number of records permitted in a first display mode;
    determining, using a computer, if the query will return a number of records from a dataset that exceeds the threshold value;
    if the results value is equal or below the threshold value, then providing the query results in a first mode; and
    if the results value is above the threshold value, then providing the query results in a second mode; and
    wherein the first mode comprises providing requested fields from each of the returned records, and the second mode comprises providing a rendered image including results data;
    the threshold value is set at least partially by determining a type of rendering engine utilized by the client computer.

2. The method of claim 1, wherein,
    the threshold value is set at least partially by using a characteristic of the dataset that is being queried to obtain the query results.

3. The method of claim 1, wherein,
    the rendered image includes a map overlay.

* * * * *